(12) United States Patent
Lureau et al.

(10) Patent No.: US 9,343,866 B2
(45) Date of Patent: May 17, 2016

(54) OPTICAL PUMPING STRUCTURE

(75) Inventors: François Lureau, Paris (FR); Pascal Rousseau, Viroflay (FR); Marc Renaud, Montigny le Bretonneux (FR); Alain Feral, Saint Maur (FR); Alain Nicolini, Igny (FR)

(73) Assignee: Thales, Courbevoie (FR)

( * ) Notice: Subject to any disclaimer, the term of this patent is extended or adjusted under 35 U.S.C. 154(b) by 108 days.

(21) Appl. No.: 13/119,429

(22) PCT Filed: Jul. 6, 2009

(86) PCT No.: PCT/EP2009/058523
§ 371 (c)(1),
(2), (4) Date: Jun. 10, 2011

(87) PCT Pub. No.: WO2010/031606
PCT Pub. Date: Mar. 25, 2010

(65) Prior Publication Data
US 2011/0235662 A1    Sep. 29, 2011

(30) Foreign Application Priority Data
Sep. 17, 2008 (FR) ..................... 08 05111

(51) Int. Cl.
H01S 3/02 (2006.01)
H01S 3/042 (2006.01)
H01S 3/0941 (2006.01)
H01S 3/04 (2006.01)
H01S 3/06 (2006.01)

(52) U.S. Cl.
CPC ............... *H01S 3/0941* (2013.01); *H01S 3/025* (2013.01); *H01S 3/042* (2013.01); *H01S 3/0405* (2013.01); *H01S 3/061* (2013.01)

(58) Field of Classification Search
CPC ......... H01S 3/061; H01S 3/025; H01S 3/042; H01S 3/0405
USPC ...................................... 372/34–36
See application file for complete search history.

(56) References Cited

U.S. PATENT DOCUMENTS

| 5,311,528 | A | * | 5/1994 | Fujino ............................. 372/35 |
| 5,774,488 | A | | 6/1998 | Kmetec |
| 6,101,208 | A | | 8/2000 | Gokay |
| 7,082,149 | B1 | | 7/2006 | Yin et al. |

FOREIGN PATENT DOCUMENTS

| EP | 1 463 165 A1 | 9/2004 |
| GB | 2 276 973 A | 10/1994 |
| WO | 2007/074400 A2 | 7/2007 |
| WO | 2008/107409 A1 | 9/2008 |

* cited by examiner

*Primary Examiner* — Jessica Stultz
*Assistant Examiner* — Marcia Golub-Miller
(74) *Attorney, Agent, or Firm* — Baker & Hostetler LLP

(57) ABSTRACT

An optical pumping structure for lasers includes: an active medium in the form of a cylindrical rod with a circular cross-section, said rod being inserted at its ends into two rings made of a thermally conductive material; at least three stacks of pumping diode strips arranged in the form of a star around the rod; and a support temperature-regulated by a Peltier-effect module. The rings are in contact with the support, and a stack of diodes, called bottom stack, being situated between the rod and the support, and the structure comprises, for each other stack, a thermal conduction block forming a support for said stack, these blocks being mounted on the cooled support and not being in contact with one another or with the rings.

4 Claims, 2 Drawing Sheets

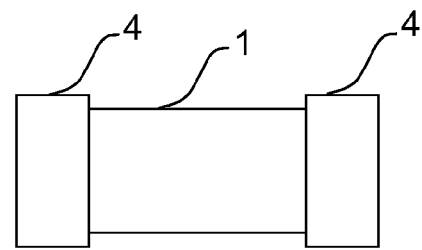
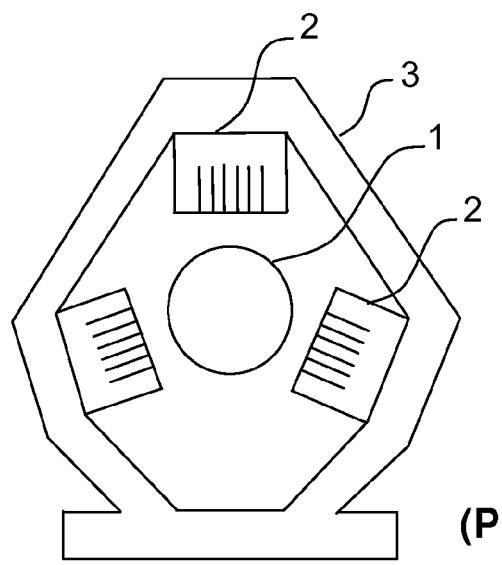
FIG.1b
(PRIOR ART)
FIG.1c
(PRIOR ART)
FIG.1a (PRIOR ART)
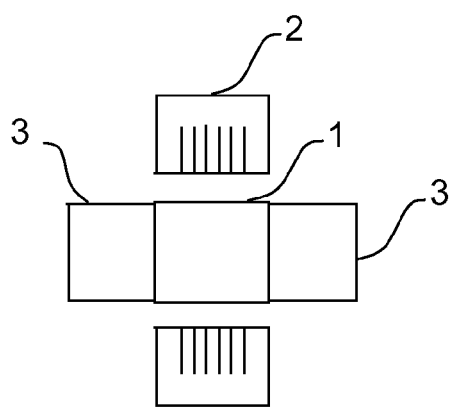
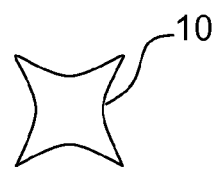
FIG.2a
(PRIOR ART)
FIG.2b
(PRIOR ART)

OPTICAL PUMPING STRUCTURE

CROSS-REFERENCE TO RELATED APPLICATIONS

This application is a National Stage of International patent application PCT/EP2009/058523, filed on Jul. 6, 2009, which claims priority to foreign French patent application No. FR 0805111, filed on Sep. 17, 2008, the disclosures of which are incorporated by reference in their entirety.

FIELD OF THE INVENTION

The field of the invention is that of optical pumping for a laser and more specifically that of diode pumping.

BACKGROUND

The optical pumping structure is a subassembly that is critical to laser performance.

It requires good extraction of the thermal power dissipated into the active medium but also a good uniformity of the temperatures of the pumping diodes used, in order to ensure a uniform distribution of the gain of the laser during a firing sequence and at different rates between two consecutive pulses in the case of a pulsed laser. It will be recalled that for a pulsed laser, the average power dissipated by the structure, $P_{avg}$, is given by the relationship: $P_{avg}=P_{diodes} \times$ nb diodes $\times$ pumping time $\times$ pulse rate, $P_{diodes}$ being the power of each set of pumping diodes.

The rate and the duration of the pumping linked to the duration of the firing sequence therefore vary the dissipated power which has an impact on optical performance.

There are currently pumping structures with a rectangular configuration, a cross-sectional view of which is shown in FIG. 2a. Such a structure comprises a longitudinal rod 1 with a square cross section used as the active medium; it is pumped by two sets of diodes 2 arranged along the rod and opposite two parallel faces, the two other faces of the rod being in contact with an element for extracting heat 3 by conduction. While such a configuration is effective for the thermal dissipation, it is not so effective with respect to the quality of the beam obtained at the output: the figure of the output beam 10 shown in cross-section in FIG. 2b, imposed by the geometry of the section, is not circular.

Another solution involves using a pumping structure with circular configuration, that is to say, comprising a rod 1 with circular cross-section; a cross-sectional view is shown in FIG. 1a. The figure of the output beam 10, imposed by the geometry of the section and shown in FIG. 1b, is then circular which ensures a good quality beam. Sets of pumping diodes 2, for example three sets, are arranged in the form of a star around the rod 1. Thermal dissipation elements in the form of aluminum rings 4 grip the rod 1 at its ends as can be seen in FIG. 1c; the thermal dissipation is also provided by a cooling device 3 that uses a circulation of liquid which links the sets of diodes 2 as can be seen in cross-section in FIG. 1a. An example of such a pumping structure with liquid cooling and comprising four sets of diodes arranged in the form of a star is presented in the U.S. Pat. No. 6,101,208, which also indicates that cooling by conduction does not give satisfaction. In this case, the good quality of the beam is obtained to the detriment of a significant bulk and the use of a coolant.

An effective cooling using a gas (air for example) instead of a liquid in a minimum bulk is a major issue.

Consequently, there remains, to this day, a need for a pumping structure that simultaneously satisfies all the abovementioned requirements, namely a cooling by gas, a good extraction of the thermal power dissipated into the active medium (reduction of the temperatures and of the axial and longitudinal internal thermal gradients), a good uniformity of the temperatures of the pumping diodes used, a minimum bulk and a good quality of the optical beam.

SUMMARY OF THE INVENTION

More specifically, the subject of the invention is an optical pumping structure for lasers which comprises an active medium in the form of a cylindrical rod with a circular cross-section, said rod being inserted at its ends into two rings made of a thermally conductive material, at least three stacks of pumping diode strips arranged in the form of a star around the rod, a support temperature-regulated by a Peltier-effect module. It is mainly characterized in that the rings are in contact with the support, and in that a stack of diodes, called bottom stack, being situated between the rod and the support, the structure comprises, for each other stack, a thermal conduction block forming a support for said stack, these blocks being mounted on the cooled support but not being in contact with one another or with the rings.

It also advantageously comprises a shim made of a thermally conductive material, situated under the bottom stack to adapt the thermal resistance between this stack and its support.

According to a characteristic of the invention, the shim includes at least one hole, possibly filled with a thermally conductive material other than that of the shim.

According to another characteristic of the invention, a ring is fixed to the support by a flexible flange that makes it possible to absorb the differential thermal expansions between the rod and its support, namely the rings.

BRIEF DESCRIPTION OF THE DRAWINGS

Other features and advantages of the invention will become apparent from reading the following detailed description, given as a nonlimiting example and with reference to the appended drawings in which:

FIG. 1, already described, schematically represent cross-sectional views of an optical pumping structure with cylindrical rod with circular cross-section according to the state of the art, seen from the front (FIG. 1a), from the side (FIG. 1c) and the resulting shape of the beam (FIG. 1b), FIG. 2, already described, schematically represent cross-sectional views of an optical pumping structure with cylindrical rod with square cross-section according to the state of the art, seen from the front (FIG. 2a), and the resulting shape of the beam (FIG. 2b), FIG. 3 represent the successive steps in assembling an optical pumping structure with cylindrical rod with circular cross-section according to the invention.

From one figure to another, the same elements are identified by the same references.

DETAILED DESCRIPTION

Figure 3A:
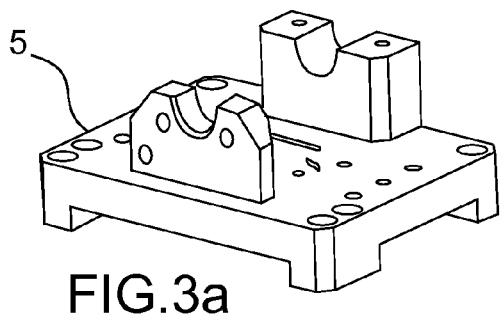
Figure 3B:
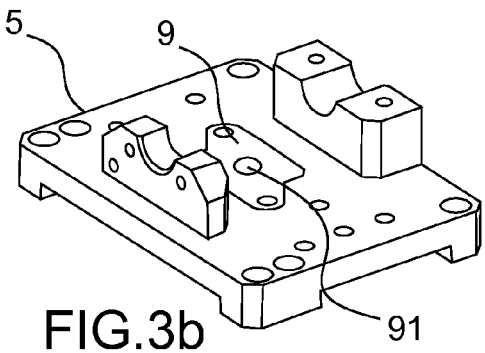
Figure 3C:
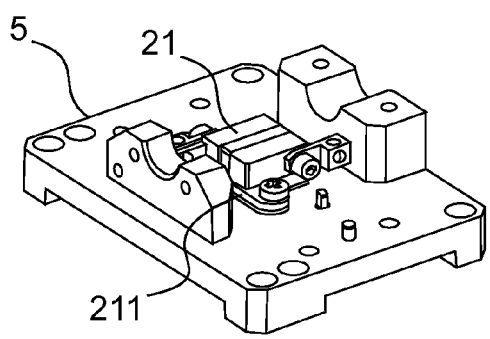

The various elements of an exemplary optical pumping structure according to the invention are described in relation to FIG. 3, as this structure is assembled.

It comprises a support 5 which serves as a thermal distributor and on which is placed a stack of pumping diodes called bottom stack 21 mounted on a base plate 211. This support 5 is made of a thermally conductive material such as copper or an aluminum alloy.

The active medium is in the form of a cylindrical rod with circular cross-section 1; it is inserted at its ends into two rings 11 made of copper or of aluminum alloy which make it possible to extract at the ends, by conduction and symmetrically, the thermal power dissipated into the rod. This rod, provided with its two rings, is installed on the support 5, the rings 11 being in contact with said support 5; it is fixed to the support 5 for example by means of a flange 6 which is sufficiently flexible to hold the rod, while making it possible to absorb the differential thermal expansions between the rod 1 and its support, namely the rings 11. The rod is mounted above the stack of diodes 21 so that this stack 21 is arranged along the central part of the rod, left free by the rings, slightly distant from the latter.

A second stack of pumping diodes, called lateral stack 22, also mounted on a base plate 221, is fixed to a thermal conduction block 7 forming a support for this stack 22; this support block 7 is mounted on the support 5 so that the stack is arranged along the central part of the rod 1, left free by the rings as previously. The support block 7 is made of copper or of aluminum alloy and is partially in contact with the support 5.

Figure 3D:
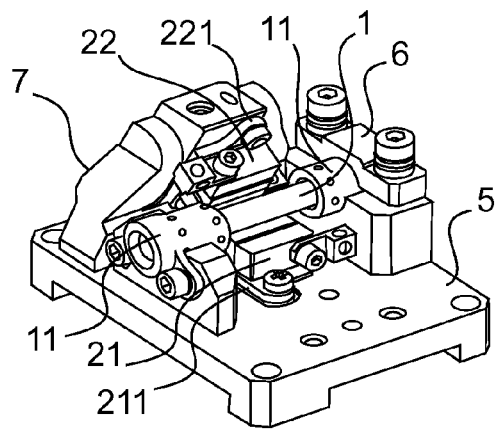
Figure 3E:
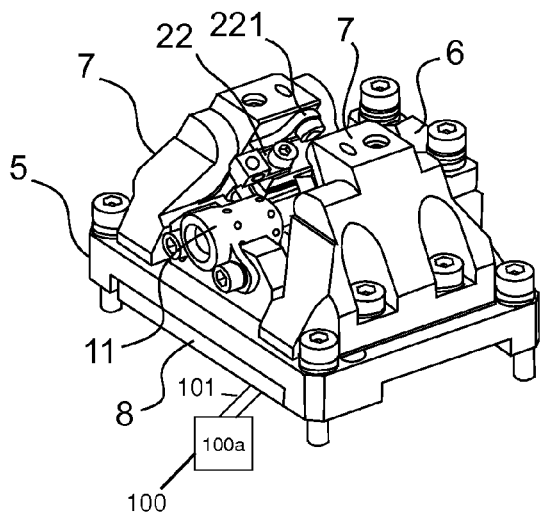

As for the second stack, a third stack of pumping diodes, also called lateral stack 22, fixed to a thermal conduction block 7 forming a support, is mounted on the support 5. This block 7 is also made of copper or of aluminum alloy. The three stacks of diodes 21, 22 are arranged symmetrically around the rod 1, in the form of a star, or at approximately 120° from one another. As can be seen in FIGS. 3d and 3e, these stacks have the same placement according to the longitudinal axis of the rod and there is no thermal conduction block 7 for the bottom stack of diodes 21.

The support blocks 7 are not directly in contact with one another or with the rings 11 of the rod. In this way, the management of the temperatures of the diodes interferes minimally with that of the rod. This thermal and mechanical design makes it possible to ensure an optimum temperature uniformity of the three stacks of diodes.

A Peltier-effect module 8 is added under the support 5 to regulate the temperature of the stacks of diodes and evacuate the dissipated power, the assembly being mounted on a metallic heat exchanger 100 with circulation of a gas 100a (air, for example) instead of a liquid as coolant, this metallic heat exchanger 100 being in contact with the hot face of the Peltier-effect module 8. An interface 101 between the Peltier-effect module 8 and this metallic heat exchanger 100 may also be added.

The thermal resistance between a stack of diodes 21 or 22 and its support 5 or 7 is adapted so as to make the three stacks of diodes uniform in temperature, which makes it possible to minimize the wavelength variations during a firing sequence or at different rates, and thus ensures a uniform distribution of the gain deposited into the rod.

To this end, the structure advantageously includes a shim 9 made of thermally conductive material such as copper or an aluminum alloy, situated under the bottom stack 21 to adapt the thermal resistance between this stack and its support 5. A hole 91, or even several holes, may also be formed in this shim 9 and possibly be filled with a thermally conductive material other than that of the shim, such as, for example, indium or an alumina-filled silicone, to adapt the thermal resistance between the stack and its support.

The pumping structure according to the invention makes it possible to obtain a low temperature difference between the stacks of diodes and symmetrically extract the power dissipated into the rod.

The use of a gas (air for example) instead of a liquid as coolant also makes it possible to reduce the weight of the device, to increase its reliability (in particular associated with the risks of leakage of the liquid for the devices of the prior art) and to reduce the logistical and maintenance constraints.

Its overall volume is small in comparison to the optical geometry. Finally, the procedure for assembling this structure is optimized.

An optical pumping structure according to the invention has been produced with the following characteristics:
rod diameter approximately 4 mm,
thermal power deposited into the Nd:Yag rod approximately 2 watts average,
emitted wavelength equal to approximately 1 µm,
3 stacks of approximately 10 strips of diodes, distributed at 120° and approximately 1.5 mm away from the rod,
power of a stack approximately 3 watts,
diode wavelength approximately 808 nm,
temperature difference between the base of the bottom stack and the metallic exchanger with gas circulation <3° C.,
temperature difference between the top of the base of a lateral stack and the bottom of the base <3° C.,
temperature difference between the bottom stack and a lateral stack <1° C.,
bulk approximately 0.07 l
constant performance levels for a rate varying between 1 and 20 Hz.

Examples of materials used are given in the table below as an indication.

| PART | MATERIAL |
| --- | --- |
| Diode base plates 211, 221 | Copper |
| Lateral stack supports (block 7) | Copper or aluminum alloy |
| Adjusting shims 9 | Copper or aluminum alloy |
| Rod 1 | YAG |
| Rings 11 | Copper or aluminum alloy |
| Interface with Peltier module | Indium or alumina-filled silicone |
| Support 5 | Copper or aluminum alloy |

The invention claimed is:

1. An optical pumping structure for lasers comprising:
an active medium in the form of a cylindrical rod with a circular cross-section, said cylindrical rod being inserted at its ends into two rings to cover the ends, separated from each other and arranged to fully expose the cylindrical rod along a length in between said two rings, said two rings made of a thermally conductive material configured to extract heat generated by the cylindrical rod by conduction;
at least three stacks of pumping diode strips arranged in the form of a star around the cylindrical rod; and
a support temperature-regulated by a Peltier-effect module,
wherein the two rings are in contact with the support, and wherein a stack of diodes, being a bottom stack, is situated between the cylindrical rod and the support, and the optical pumping structure further comprises, for each other stack, a thermal conduction block forming a support for respective said stack, said thermal conduction block being mounted on the cooled support and not being in direct contact with one another, and said thermal block not being in direct contact with the two rings, the optical pumping structure further comprising:
a shim made of a thermally conductive material situated under a bottom stack to adapt a thermal resistance between the bottom stack and a support of the bottom stack, wherein the shim includes at least one hole.

2. The optical pumping structure for lasers as claimed in claim 1, further comprising a heat exchanger mounted on the face of the Peltier-effect module close to the support.

3. The optical pumping structure for lasers as claimed in claim 1, wherein the hole is filled with a thermally conductive material other than that of the shim.

4. The optical pumping structure for lasers as claimed in claim 1 further comprising a flexible flange holding a ring.

* * * * *